Figure 1:
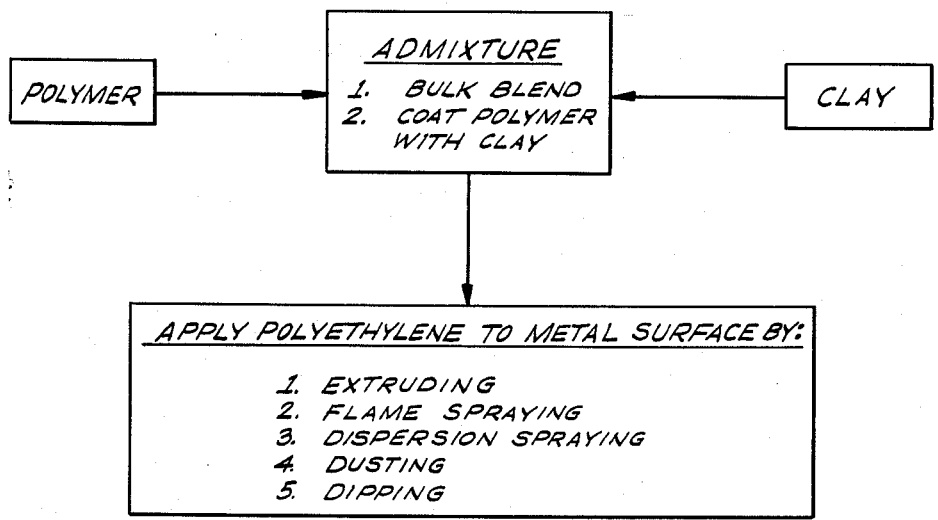

Nov. 19, 1963        P. G. NAHIN        3,111,419

BONDING METAL AND POLYETHYLENE

Filed Aug. 1, 1960

INVENTOR.
PAUL G. NAHIN
BY
*Robert E. Strauss*
ATTORNEY

United States Patent Office 3,111,419
Patented Nov. 19, 1963

3,111,419
BONDING METAL AND POLYETHYLENE
Paul G. Nahin, Brea, Calif., assignor to Union Oil Company of California, Los Angeles, Calif., a corporation of California
Filed Aug. 1, 1960, Ser. No. 46,376
20 Claims. (Cl. 117—21)

This invention relates to bonding of metal and polyolefin surfaces and in particular, polyethylene surfaces.

It is frequently desirable to coat metallic objects with plastic, particularly low cost polyethylene, so as to produce laminated products or provide a corrosion resistant film on the metallic object. It is also frequently desirable to metallize, i.e., metal coat, plastic objects so as to impart a metallic luster and high reflectivity to the object.

In the coating of metal surfaces with polyethylene, e.g., in the lining of tanks, chemical equipment, etc., an adherent coating has been obtained by applying a polyethylene powder to the metal surface which has been heated to about 425° to 450° Fahrenheit. Because the decomposition point of many polyethylenes is frequently as low as 500° F., it is often difficult to heat the metal surfaces uniformly to the surface temperature necessary for good adhesion without reaching the decomposition temperature of the polyethylene and thereby weakening or destroying the polyethylene.

In the metallization of molded or shaped polyethylene objects, use of temperatures above the softening point of the polymer, i.e., about 200° F. is precluded. Attempts have been made to adapt metallizing methods, e.g., vacuum and sputtering techniques, to the metallization of polyethylene by use of a suitable lacquer coating before the deposition of the metal; however, strongly adherent metal coatings are difficult to achieve by this method.

It is an object of this invention to provide highly adherent coatings of polyolefins, particularly polyethylene, to metal objects.

It is also an object of this invention to provide highly adherent metallized coatings on polyolefins, particularly polyethylene objects.

I have discovered that highly adherent bonds between metal surfaces and polyolefins can be obtained by incorporating a clay material in the bond. The clay material can be a naturally occurring clay, or a modified clay in which all or a portion of the base exchange sites of the clay have been replaced with ammonium, hydrogen, an organic moiety, or a selected metal ion. The clay can be incorporated into the metal-polymer bond by numerous methods, dependent on the nature of the coating. In metallizing plastic objects, the clay can be incorporated directly into the bulk of the polymer, it can be coated onto the surface of the polymer, or it can be incorporated into a lacquer, typically a vinyl base lacquer, which is applied to the polymer surface as a base coat before deposition of the metal. In the coating of metal objects with a polyolefin, or in the manufacture of metal foil-polymer laminates, the clay material can be incorporated into the bond by adding it to the polymer prior to applying it to the metal surface.

Figure 2:
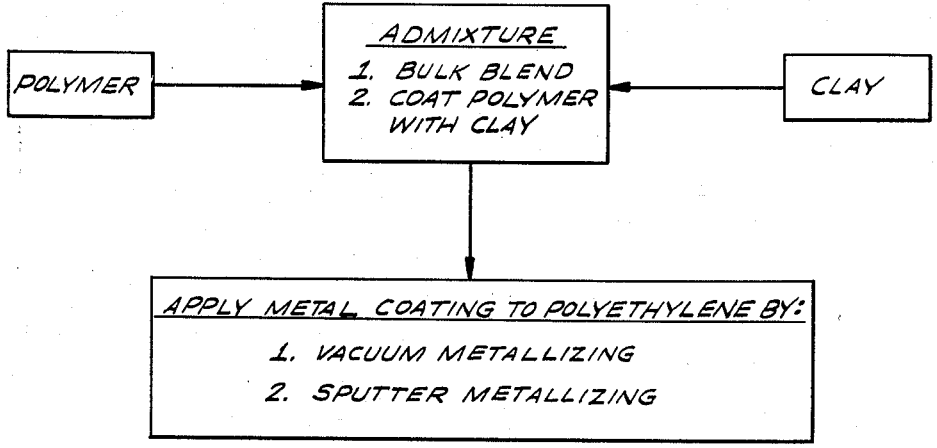

The process steps are illustrated in FIGURES 1 and 2. As shown in FIGURE 1, the polyolefin is admixed with the clay and then applied to the metal by various methods, hereinafter described in detail. In FIGURE 2, the admixture of polyolefin and clay is coated by metallizing methods, also hereinafter described.

Referring now to the nature of the clay materials suitable for use in my invention, in general, any of the natural alumino-silicates which exhibit base exchange properties can be employed. The two principal subdivisions of natural clays are the bentonites and the kaolins. The bentonite clays, as found in nature, contain a high proportion of the montmorillonite, beidellite, nontronite, hectorite, saponite, sauconite, etc. Montmorillonite may be characterized as $$(Al_{1.67}Mg_{.33})Si_4O_{10}(OH)_2(Na_{.33})$$

The kaolin clays are rich in kaolin minerals including kaolinite $(Al_2O_3 \cdot 2SiO_2 \cdot 2H_2O)$, dickite, nacrite, anauxite and halloysite. Kaoline clays are usually found to contain between about 30 to 40 percent $Al_2O_3$, while bentonite clays usually contain less than 20% thereof. Another important characteristic of bentonite clays is their high cationic base-exchange capacity, commonly running between 80 and 100 me. (milliequivalents) per 100 grams of air-dried clay. Kaolin clays on the other hand show a low cationic base-exchange capacity in the order of 2–10 me. per 100 grams of dry clay. X-ray crystallography shows the montmorillonite minerals to have three-layer lattices while kaolin minerals have a two-layer crystal lattice. Differential thermal analysis curves for montmorillonite show three endothermic peaks at 150°–320° C., 695°–730° C. and 870°–920° C., and one exothermic peak at 925°–1050° C. Similar curves for kaolinite show a strong endothermic peak at 620° C. and a strong exothermic peak at 980° C. which sharply differentiate it from other clay mineral groups.

The bentonite clays can be divided into two general categories, the swelling and nonswelling types. The latter occurs in many widely separated areas including Arizona, California, Texas, Arkansas, Mississippi, Kentucky, Tennessee and many foreign countries. Swelling type bentonites are found in Wyoming, South Dakota, Montana, Utah, Neveda and California. Of this type, it is preferred to employ herein the type of swelling bentonite such as is found in Wyoming where it occurs in a high degree of purity. The montmorillonite and kaolinite type clays are in general preferred, although other clays can be employed provided they have sufficient base-exchange capacity, i.e., at least about 1 me. per 100 grams.

The aforementioned clays are usually found in a form wherein the base-exchange sites are occupied by alkali or alkaline-earth metals, and can be employed as such or converted to the ammonium, hydrogen, organo or metal form, wherein the base exchange sites are occupied by ammonium, hydrogen, an organic moiety or a selected metal ion. The ammonium form is obtained by exchanging ammonium ion for the naturally occurring alkali or alkaline earth metal ions in a suitable manner, e.g., by passing an aqueous suspension of the clay over an ammonium ion-charged cation exchange resin such as Amberlite IR–120. During this exchange, any naturally occurring adsorbed salts are removed from the clay as dissolved ammonium salts. The resultant suspension of ammonium clay and dissolved salts is then passed over an anion exchange resin, e.g., Amberlite IRA–410 (hydroxyl form) to remove the dissolved salts.

The acid form of the clay can be obtained by leaching the clay with a strong mineral acid such as sulfuric, nitric, hydrochloric, etc., or by passing an aqueous suspension of the clay over a cation exchange resin such as hydrogen Amberlite IR–120. Because the clay usually contains adsorbed salts, it is preferred to remove these by passing the clay suspension first over an ammonium form cation exchange resin to convert the adsorbed salts to soluble ammonium salts. The clay suspension is then passed over a hydroxyl form anion exchange resin to convert the dissolved ammonium salts to ammonium hydroxide. After this treatment the clay suspension is then passed over the aforementioned hydrogen-charged cation exchange resin to obtain the hydrogen clay.

The organoclays which are the preferred agents of my invention because of their ease of dispersion in polyethylene and organic solvents can comprise, in general, any sufficiently basic monomeric or polymeric amine or ammonium compound containing an organic group having less than about 20 and preferably less than about 10 carbon atoms. It is preferred that the primary amines or ammonium compounds be employed since they are capable of forming strong bonds with the clay matrix. The length of the carbon chain of the organic moiety is preferably relatively short so as to prevent masking or blocking the clay surface from exposure to the metal.

The organic base compound of the preferred organoclay materials can comprise any sufficiently basic monomeric or polymeric amine or ammonium compound containing one or more methylene linkages and which is composed of aryl, alkyl or alkenyl radicals. A substantial hydrocarbon moiety, greater than about 5 carbon atoms is preferred for ease of dispersibility of the clay in polyolefins or organic solvents. The hydrocarbon moiety, however, cannot be so great as to mask the surface of the clay by steric effects and generally should contain less than about 20 carbon atoms. Suitable organic bases include, for example, the aryl, alkyl or alkenyl monoamines and polyamines, e.g., ethylamine, 1-propylamine, 1-butylamine, 1-hexylamine, 1-dodecylamine, octadecylamine, ethylene diamine, hexamethylene diamine, diethyl-amine, triethylamine, di-n-hexyl amine, oleylamine, linoleylamine, polyvinyl amines, polyallylamines, polymethylamines, β-phenylethylamine, phenyldodecyl amine, etc. Heterocyclic nitrogen bases can also be employed, e.g., piperidine, pyrrolidine, piperazine, 4-vinylpyridine, and the like.

The aforementioned bases can be added to the clay by either of two general methods. According to the first method, the clay, in its naturally occurring form wherein the base-exchange sites are occupied mainly by alkali metal or alkaline earth metal, is first converted to the acid form by replacing the alkali metal or alkaline earth metal ions with hydrogen ions. This may be accomplished either by leaching the clay with mineral acids or contacting it in aqueous suspensions with a hydrogen charged cation exchange resin, such as Amberlite IR–120. The resulting acid clay, e.g., hydrogen montmorillonite, may then be contacted directly with a stoichiometric amount of organic base. These two reactions are illustrated generally by the following equations wherein M designates a montmorillonite and B designates an organic monoamine such as oleylamine:

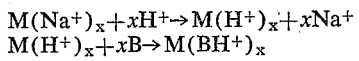

$$M(Na^+)_x + xH^+ \rightarrow M(H^+)_x + xNa^+$$
$$M(H^+)_x + xB \rightarrow M(BH^+)_x$$

According to the second general method for preparing the organoclay adduct, the organic base is first quaternized by treatment with an acid such as hydrochloric, sulfuric, acetic, phosphoric, etc., or with an organic halide such as methyl chloride, ethyl bromide, or the like. Other quaternizing agents include esters such as methyl sulfate, triethylphosphate, ethyl nitrate and the like. By any of these methods, the organic base is converted to a cation and, upon dissolving in water, gives rise by electrolytic dissociation to positively charged ions. These quaternized bases are hence dissolved in water and the clay in its natural form may then be stirred into the solution, whereupon the organoclay is formed by metathesis as illustrated by the equation:

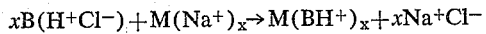

$$xB(H^+Cl^-) + M(Na^+)_x \rightarrow M(BH^+)_x + xNa^+Cl^-$$

By either of the foregoing methods, the organoclay is usually formed in aqueous suspension, and is filtered off, washed and dried. It is preferred to use substantially stoichiometric quantities of organic base and clay when the organic base has between 1 to 10 carbon atoms. This ratio is determined by the base-exchange capacity of the clay, as will be understood by those skilled in the art. When the organic base contains between about 10 to about 20 carbon atoms it is preferred to use less than the stoichiometric amount of organic base, preferably between about 25 to about 75 percent of the stoichiometric quantity. It is found, in general, that the stoichiometric equivalent of the aforedescribed organic bases will amount to about 0.1 to 20% by weight of the clay. It is preferred to employ between about 0.5% and 15% by weight of the base; larger quantities are in most instances superfluous and give no added advantage.

The metal ion form of clay can be obtained by treating an aqueous suspension of clay with an aqueous solution of a soluble salt of the desired metal so as to exchange the naturally occurring alkali or alkaline-earth metals with the metal ion from the salt solution. Another method is to pass an aqueous suspension of the clay over a suitable cation exchange resin charged with the metal ion to replace the naturally occurring ions. Although any metal ion is suitable, i.e., any electropositive chemical element which can replace the hydrogen of an acid and form a base with the hydroxyl radical, it is preferred to employ ions of the same metal as that to which the polyolefin is to be bonded so as to obtain the maximum adhesion in the bond. Thus, when it is desired to bond a polyolefin to aluminum, the clay material to be incorporated in the bond is treated so as to replace all or a portion of its naturally occurring ions with aluminum ions. This is accomplished by cation exchange with an aluminum charged ion exchange resin or by washing the clay with a solution of a soluble aluminum salt such as aluminum sulfate, nitrate, etc. Similar treatment with cuprous or cupric, ferrous or ferric, stannous or stannic and zinc salt solutions or charged ion exchange resins can be employed when it is desired to bond polyolefins to their respective metals, i.e., copper, ferrous metals, tin or zinc.

After the clay materials have been prepared in their desired form, they are incorporated into the metal-polyolefin bond in accordance with my invention as hereinafter described. In the coating of metallic objects with polyolefins, e.g., polyethylene, a film of polyethylene can be extruded directly onto a metal surface and bonded thereto by the application of heat and pressure. This technique can be employed to produce aluminum foil-polyethylene laminates useful in the packaging industry by extruding alternate films of polyethylene between sheets of metal foil. The thickness of the polyethylene and the metal foil employed can be widely varied depending on the ultimate properties desired, e.g., between about 0.1 to about 20 mils, thicker metal films being employed to obtain a more rigid material and thicker polyethylene films being employed to obtain a more flexible product. The number of alternate films in the laminate also determines the strength and rigidity of the final product; a two-layer laminate being very flexible, a laminate comprising a single metal foil between two polyethylene films having a leather-like appearance, and laminates of more layers being more rigid.

In the aforedescribed coating techniques, my invention comprises the addition of a clay material in amounts between about 0.1 to about 80 weight percent of the polyethylene. Preferably the aforedescribed clay materials are added to the bulk polyethylene prior to its extrusion into a film by milling the clay material into the polyethylene which has been heated to its softening point, about 100° C. The preferred clay material for this application is an organoclay for ease of dispersion in the polyethylene. If desired, the finally shaped polyethylene object containing the organoclay before or after surface coating with metal can be subjected to irradiation as disclosed in my co-pending application Serial No. 712,618, abandoned in favor of continuation-in-part application Serial No. 100,520, now U.S. Patent No. 3,084,117, so as to crosslink the polyethylene and to chemically bind the polyethylene to the organic moiety of the organoclay. As disclosed in my aforementioned application, such irradiation results in a marked improvement in the tensile strength and solvent resistance of the polymer.

Metallic objects having irregular shapes and surfaces cannot readily be coated by applying a polyethylene film but must be coated with powdered polyethylene. The metal surface to be coated is usually heated to about 450° F. and thereafter powdered polyethylene of a size range generally less than about 40 mesh is applied. Small metal objects can be satisfactorily coated by dipping them into polyethylene powder, which, if desired, can be in a fluidized bed, whereas objects too large for this method can be coated by spraying or dusting the powdered polymer onto their surfaces. A modification of the latter method is flame spraying wherein the polyethylene powder is sprayed onto the metal surface through a gas flame in a manner similar to the flame spraying of metals. In this technique, polyethylene powder is suspended in and surrounded by a carrier gas, generally air, and this stream is passed through a flame zone to heat the polyethylene to its fusing point. The stream is then directed against the surface to be coated. The operation is facilitated by use of a single flame gun which has separate supplies of a combustible gas, air, and the polyethylene-carrier gas suspension. In use, the combustible gas and air are supplied to the gun, mixed, ignited and directed against the metal surface so as to heat the surface. After the desired temperature (about 425°–450° F.) is reached, the valve controlling the polyethylene supply is opened to direct the polyethylene through the flame and against the heated metal surface. These various coating techniques are described in detail in The Technology and Uses of Ethylene Polymers, by Renfrew and Morgan, pp. 427 to 440 (1957).

The application of my invention to these powder coating techniques comprises incorporating a clay material into the polyethylene which is applied to the metal surface. The clay material is added as a powder of a size less than about 40 mesh, and preferably less than about 325 mesh, in amounts ranging between about 1 to about 50 weight percent. The clay material can be obtained in powder form by any suitable method, for instance by spray drying, drying and pulverizing, etc. When the polyethylene powder contains the clay material in accordance with my invention, I have discovered that the necessary surface temperatures of the metal can be drastically reduced from about 450° F. to about 300° F. The use of such lower temperatures is advantageous because it safeguards against the danger of exceeding the decomposition temperature of polyethylene and thereby insures that the polyethylene coating will not be weakened or destroyed.

Dispersion spraying of polyethylene wherein a dispersion of the polymer in a suitable organic solvent is sprayed onto a metal surface is another coating technique to which my invention applies. In this method, the organic solvent is volatilized after contact with the metal and the polyethylene is thereby deposited. After deposition of the polyethylene, the coated object is heated to a sufficient temperature, about 425° to 450° F., to fuse the polyethylene into an adherent film. The polyethylene dispersion is commonly prepared by dissolving polyethylene in a suitable hot solvent, for example, trichloroethylene, toluene, xylene, etc., and then adding a precipitant, e.g., an alcohol, to produce a suspension of finely divided polyethylene. In accordance with my invention, a clay material in a suitably finely divided form can be added to this polyethylene dispersion in amounts between about 0.1 to about 50 weight percent. If desired, incorporation of the finely divided clay into the polymer dispersion can be promoted by the use of suitable non-ionic wetting agent, such as the polyoxyethylene esters of fatty acids, e.g., oleic, palmitic, lauric acids, etc.; polyoxyethylene ethers of fatty alcohols such as lauryl oleyl alcohol; polyoxyethylene ethers of alkyl or alkenyl phenols such as hexyl phenol, isoamyl cresol, lauryl cresol, etc. A more complete description of this class of non-ionic dispersing agents is set forth by Moilliet and Collie in Surface Activity, pp. 342–352 (1951). Preferably, one of the aforedescribed organoclay materials, e.g., oleyl amine kaolinite, 4-vinyl pyridine montmorillonite, etc., is added to the polyethylene dispersion since these materials are readily dispersible in organic solvents. Use of a clay material in accordance with my invention greatly improves the adhesion of the polyolefin to the metal and reduces the necessary heating temperature to between about 250° and 425° F. Polyolefin surfaces can readily be coated with metals by use of my invention. Objects having flat surfaces can be coated with metal foil by incorporating a clay material in the bond and pressing the metal foil to the surface in a heated press at a temperature between about 250° to about 425° F.; preferably between about 300° to about 350° F., and a pressure between about 100 to about 1500 p.s.i. The metal foil can also be applied in conventional polyethylene injection molding by lining the mold with the foil prior to injection of polyethylene. The clay material can be incorporated into the bond in accordance with my invention by various methods. The clay material in amounts between about 0.1 to about 80 weight percent can be milled into the bulk polyethylene prior to its shaping or molding. When so added, I prefer to employ the aforedescribed organoclay materials for ease of dispersion in the polyethylene. Another method of incorporating the clay material into the bond is to apply it to the surface of the molded polyethylene object. This can be accomplished by dispersing the clay material in a suitable carrier liquid which preferably is also a solvent for the polyethylene, e.g., toluene, trichloroethylene, acetone, benzene, ethyl ether, xylene, etc., and then brushing or spraying the dispersion onto the surface. Between about 0.1 and about 50 weight percent of clay can be incorporated into the dispersion. While any of the aforedescribed clay materials can be employed in this surface coating, it is preferred to use the organoclay material because of the ease with which the organoclay can be dispersed in the solvent.

Polyethylene objects having irregular shapes can be coated with a metal by metallizing techniques such as the vacuum and sputtering methods. In these methods, the plastic object is placed into a chamber along with a supply of the surfacing metal. This metal is volatilized in the chamber and condenses onto the cool surfaces of the plastic object. In the vacuum method, the chamber is normally evacuated to about 0.1 to 1 micron of mercury and the surfacing metal is heated to about 1500° to 2500° F. by a resistance heater centrally disposed in the chamber. At these temperatures the metal volatilizes into the vapor space of the chamber and condenses on exposed surfaces presented by the plastic object. Another technique employed is the vacuum sputtering method wherein the surfacing metal is volatilized by the application of a negative voltage to the metal so as to drive atoms of the metal into the vapor space of the chamber wherein they deposit on the exposed surfaces of the plastic articles. The voltages employed in this method are between about 200 to about 1000 volts. Because this method can be conducted under higher pressures, e.g., at about 0.1 to about 1 millimeter of mercury, less extensive evacuating systems are required than in the aforedescribed vacuum process. Some metals, notably aluminum, cannot be volatilized by the sputtering method but are readily volatilized in the vacuum method. In each of the aforedescribed metallizing processes it is common and often essential that the plastic surface be coated with a "base" of lacquer prior to metallizing. Phenolic base lacquers are commonly employed for thermosetting plastics; vinyl base lacquers are employed for thermoplastic polymers. This lacquer coat improves the metal adhesion and serves as a barrier to prevent the plastic from outgassing, i.e., releasing gases under the low pressure in the vacuum chamber. Many plastics are readily metallized by this method, e.g., cellulose acetates, acrylates, phenolics, etc.; however, as yet polyolefins, particularly polyethylene, have not been successfully metallized because of the poor adhesion of the deposited metal.

My invention as applied to the aforedescribed metallizing processes comprises incorporating a clay material in the surface upon which the metal is deposited to thereby improve metal adhesion to polyolefin. Conveniently, this can be accomplished by dispersing any of the aforementioned modified clay or organoclay materials into the vinyl base lacquer employed as a base coat prior to metallizing. The clay material can be dispersed in the lacquer by use of an organic dispersing agent, or preferably, the organoclay form of the clay is employed and no dispersing agent is necessary. Typical of vinyl resins useful as lacquers are polyvinyl acetate and polyvinyl acetals, i.e., the resin obtained by replacement of some or all the hydroxyl groups of polyvinyl alcohol with a suitable aldehyde such as formaldehyde, acetaldehyde, propanol, butyraldehyde, etc. These resins are dissolved in a suitable volatile solvent, e.g., methanol, ethanol, methyl and ethyl acetate, acetone, dioxane, 1-2 dichloroethane, dichloroethylene, trichloroethylene, tetrachloroethane, etc., in concentrations between about 0.1 and about 30 weight percent. In accordance with my invention, between about 0.1 and 9 parts of clay is added to the lacquer per part of vinyl resin.

Finely divided clay such as powdered montmorillonite or kaolinite is dispersed into these vinyl lacquers with the aid of any of the aforedescribed nonionic dispersing agents. Preferably, however, an organoclay such as oleylamine montmorillonite, hexamethylene diamine kaolinite, 4-vinyl pyridine kaolinite, etc. is employed which, because of its organic substituent can readily be dispersed into the lacquer without resort to a dispersing agent. When a lacquer containing a clay material is brushed or sprayed onto the plastic surface, the solvent evaporated, the object thereafter placed into the chamber, and the metallization conducted in the otherwise conventional manner, an adherent metallized coating on polyethylene results.

The following examples will illustrate my invention:

*Example 1*

A hydrogen modified clay was prepared as follows: Fifteen hundred grams of as-received Wyoming montmorillonite were dispersed in 15 gallons of distilled water using a one-gallon Waring Blendor. The suspension was allowed to settle for one hour, and then all but the bottom two inches of colloid was pumped through a 30-inch column of ammonium charged Amberlite IR–120 cation exchange resin to convert the clay to the ammonium form and to dissolve adsorbed salts. The effluent from this column went directly to a similar column of Amberlite IR–410 anion exchange resin to convert the dissolved ammonium salts to ammonium hydroxide. This effluent was then passed through a 40-inch column of hydrogen charged Amberlite IR–120 ion exchange resin. The product, which contained 15.4 grams of hydrogen clay per liter and a pH of 2.8, was dried on a steam roller dryer at 153° C., macerated in a Waring Blendor and powdered in a high speed pulverizer. The product had the following analysis:

| | | |
|---|---|---|
| CaO | weight percent | 0.08 |
| Nitrogen | do | 0.432 |
| Hydrogen exchange capacity | meq./100 grams | 29.3 |
| Base exchange capacity | do | 67.8 |

*Example 2*

An organoclay was prepared from a hydrogen modified clay obtained as described in Example 1 by the neutralization thereof with an alcoholic solution of 4-vinyl pyridine. An aqueous suspension of the hydrogen clay was agitated at low speed in a Waring Blendor and neutralized to a pH of 7 by addition of 4-vinyl pyridine. The resultant product was dried and powdered. The organoclay product had the following analysis:

| | | |
|---|---|---|
| Carbon | weight percent | 4.9 |
| Hydrogen | do | 1.4 |
| Nitrogen | do | 0.7 |
| Hydrogen exchange capacity | meq./100 grams | 0.2 |
| Base exchange capacity | do | 28.3 |

*Example 3*

Three samples of an organoclay containing varied amounts of oleyl amine were prepared by adding 40, 20, and 5 milliliters of an oleyl amine solution to 4-liter portions of an aqueous suspension of a hydrogen modified montmorillonite. The resultant suspensions had pH values of 7.3, 3.6 and 2.7, respectively, indicating that the first contained approximately stoichiometric amounts of hydrogen clay and oleyl amine, while the latter two contained hydrogen clay in excess of the stoichiometric quantity. The clays were filtered from the solution and dried, and by nitrogen analysis were found to contain 28.8, 13.9 and 4.7 weight percent of oleylamine, respectively.

*Example 4*

Polyethylene was heated to about 106° F. on a rubber mill, and 4-vinyl pyridine montmorillonite prepared as in Example 2 was added in a 1:1 weight ratio. The resultant organoclay-polyethylene was molded into plates one-sixteenth inch thick and then placed between aluminum foils of 1 mil thickness in a heated press and subjected to 300° F. and 3300 p.s.i. After cooling the pressed sample it was found impossible to peel the aluminum foil from the polyethylene. When polyethylene containing no clay material was pressed between aluminum foils under identical conditions, the aluminum foil failed to adhere to the polyethylene surfaces.

*Example 5*

Samples were prepared of polyethylene in 1:1 weight ratios with each of the oleyl amine montmorillonite organoclays prepared as in Example 3. The resultant organoclay-polyethylene composites were molded into plates one-sixteenth inch thick which were placed between aluminum foils one mil thick and subjected to 300° F. and 3300 p.s.i. in a heated press. The aluminum foil separated readily from the polymer which contained the stoichiometric amount of oleyl amine montmorillonite, e.g., 28.8 weight percent. The aluminum foil could not be peeled from the polymer composite having the organoclay with 13.9 weight percent oleyl amine. The aluminum adhered to the polyethylene having the organoclay with 4.7 weight percent oleyl amine; however, the adhesion was not as good as with that having 13.9 weight percent oleyl amine.

*Example 6*

The surfaces of polyethylene sheets, 0.1 inch thick, were roughened by brushing with a wire wheel. The sheets were then immersed in a toluene bath for 10 minutes at 68° F. A paste comprising 5 grams of hydrogen montmorillonite (Example 1) and 10 grams of polyethylene in 100 milliliters of toluene was then brushed onto one of the sheets. The resultant sheet of polyethylene was then placed between sheets of aluminum foil and subjected to 3300 p.s.i. and 400° F. in a heated press. A sheet of polyethylene, also roughened with a wire wheel but not brushed with the clay suspension was also pressed between aluminum foils at 3300 p.s.i. and 400° F. The aluminum foil readily peeled from the polyethylene which was not brushed with the hydrogen montmorillonite suspension but could not be peeled from the polyethylene which had been brushed with the clay suspension.

*Example 7*

Polyethylene-aluminum foil laminates were prepared by assembling alternate layers of aluminum foil and a polyethylene-organoclay film of about 1 mil thickness. This film contained 50 weight percent of the oleyl amine montmorillonite organoclay and was prepared as described in Example 5. A laminate containing a single layer of aluminum foil sandwiched between two layers of polyethylene-organoclay film was prepared in a heated press at about 300° F. and 3300 p.s.i. The resultant laminate was pliable and had a leather-like appearance and feel. A second laminate was prepared containing 5 layers of aluminum foil and 6 alternate layers of the polyethylene-oleyl amine montmorillonite film. The resultant laminate, although deformable, was more rigid than the first laminate.

As will be apparent to those skilled in the art, many compositions and modes of practicing my invention can be devised. It is apparent that the invention is also applicable to other polyolefins than polyethylene, e.g., polypropylene, polybutylene, polyisobutylene, mixed copolymers and terpolymers thereof. The foregoing description of my invention is not intended to be limited except where stated; modifications obvious to those skilled in the art are intended to be included. The true scope of my invention is intended to be defined by the following claims.

I claim:

1. The method of forming a bond between a metal surface and a polyethylene surface which comprises incorporating a natural alumino-silicate clay in said polyethylene; thereafter adjoining said surfaces and heating said adjoined surfaces to a temperature between about 250° and about 425° F.; said clay having a substantial proportion of its base exchange sites occupied by a member selected from the group consisting of metal ions, hydrogen, ammonium, organic nitrogen bases containing between about 5 and about 20 carbon atoms and mixtures thereof.

2. The process of claim 1 wherein said clay is montmorillonite having a substantial portion of its base exchange sites occupied by an organic nitrogen base.

3. The process of claim 2 wherein said organic nitrogen base is 4-vinyl pyridine.

4. The process of claim 2 wherein said organic nitrogen base is oleyl amine.

5. The process of claim 1 wherein said clay is kaolinite having a substantial portion of its base exchange sites occupied by an organic nitrogen base.

6. The process of claim 5 wherein said organic nitrogen base is 4-vinyl pyridine.

7. The process of claim 5 wherein said organic nitrogen base is oleyl amine.

8. In a process wherein a metal surface is bonded to a polyethylene surface, the method of improving the adhesion of the bonded metal to said polyethylene surface which comprises applying a clay material onto said polyethylene surface and thereafter adjoining and bonding said polyethylene to said metal, said clay material being a natural alumino-silicate having a substantial portion of its base exchange sites occupied by members selected from the group consisting of metal ions, hydrogen, ammonium, organic nitrogen bases having between about 5 and about 20 carbon atoms, and mixtures thereof.

9. The process of claim 8 wherein said clay is montmorillonite having a substantial portion of its base exchange sites occupied by an organic nitrogen base.

10. The process of claim 9 wherein said organic nitrogen base is 4-vinyl pyridine.

11. The procss of claim 9 wherein said organic nitrogen base is oleyl amine.

12. The process of claim 8 wherein said clay is kaolinite having a substantial portion of its base exchange sites occupied by an organic nitrogen base.

13. The process of claim 12 wherein said organic nitrogen base is 4-vinyl pyridine.

14. The process of claim 12 wherein said organic nitrogen base is oleyl amine.

15. In a method wherein a polyethylene film is bonded to a metal surface by the application of heat and pressure, the method of improving the strength and adhesion of said polyethylene film which comprises incorporating a clay material into said polyethylene film, applying said polyethylene to said metal surface and subjecting said joined polyethylene and metal to a temperature of about 250° to about 425° F., said clay material being a natural alumino-silicate having its base exchange sites occupied by a member selected from the group consisting of metal ions, hydrogen, ammonium, organic nitrogen bases having between about 5 and about 20 carbon atoms, and mixtures thereof.

16. The method wherein a metal surface is coated with a polyethylene by heating the metal surface to a temperature between about 250° to 425° F., and applying a polyethylene in powder form to the preheated surface, said polyethylene powder being admixed with between about 0.1 and 80 percent by weight of a natural alumino-silicate having its base exchange sites occupied by a member selected from the group consisting of metal ions, hydrogen, ammonium, organic nitrogen bases having between about 5 and about 20 carbon atoms, and mixtures thereof.

17. The method of claim 16 wherein said polyethylene powder is applied by dipping the heated metal into a bed of powder.

18. The method of claim 16 wherein said polyethylene powder is sprayed against the heated metal surface.

19. In the method wherein a metal surface is coated with a polyethylene by spraying a dispersion of polyethylene in a volatile liquid onto said metal surface and the surface is thereafter heated to volatilize said carrier liquid and fuse said polyethylene, the improvement which comprises dispersing a natural alumino-silicate in said solvent to obtain a dispersion containing between about 0.1 and about 50 weight percent of said natural alumino-silicate, said alumino-silicate having its base exchange sites occupied by a member selected from the group consisting of metal ions, hydrogen, ammonium, organic nitrogen bases having between about 5 and about 20 carbon atoms, and mixtures thereof.

20. In a process for metallizing a polyethylene surface wherein said surface is coated with a vinyl lacquer, placed in an evacuated chamber in which a coating metal is volatilized and condensed onto the vinyl lacquer coated polyethylene surface, the improvement which comprises incorporating in said lacquer between about 0.1 and about 9 parts of a natural alumino-silicate per part of vinyl resin in said lacquer, said natural alumino-silicate having its base exchange sites occupied by a member selected from the group consisting of metal ions, hydrogen, ammonium, organic nitrogen bases having between about 5 and about 20 carbon atoms, and mixtures thereof.

References Cited in the file of this patent

UNITED STATES PATENTS

| 2,406,039 | Roedel | Aug. 20, 1946 |
| 2,531,427 | Hauser | Nov. 28, 1950 |
| 2,923,651 | Petriello | Feb. 2, 1960 |
| 2,955,958 | Brown | Oct. 11, 1960 |

FOREIGN PATENTS

| 217,890 | Australia | Nov. 28, 1957 |
| 562,508 | Belgium | May 19, 1958 |